March 13, 1951  E. R. GILMORE  2,544,665
GAS METER

Filed April 21, 1947  4 Sheets-Sheet 1

INVENTOR.
Edward R. Gilmore
BY Strauch + Hoffman
Attorneys

March 13, 1951     E. R. GILMORE     2,544,665
GAS METER

Filed April 21, 1947                4 Sheets-Sheet 3

INVENTOR.
Edward R. Gilmore
BY Strauch & Hoffman
Attorneys

March 13, 1951 E. R. GILMORE 2,544,665
GAS METER

Filed April 21, 1947 4 Sheets-Sheet 4

INVENTOR.
Edward R. Gilmore
BY *Strauch & Hoffman*
Attorneys

Patented Mar. 13, 1951

2,544,665

UNITED STATES PATENT OFFICE 2,544,665

GAS METER

Edward R. Gilmore, Pittsburgh, Pa., assignor to Rockwell Manufacturing Company, Pittsburgh, Pa., a corporation of Pennsylvania Application April 21, 1947, Serial No. 742,799

2 Claims. (Cl. 121—48)

This invention relates to gas meters and has for its general object and purpose to provide a meter of the single or duplex bellows type and of large capacity, embodying a minimum number of parts of improved structural form which may be easily, quickly and accurately assembled to provide a meter of this type, of minimum overall dimensions, light in weight, and in which leakage resulting from distorting stresses incident to internal pressure is effectively precluded.

It is another important object of the invention to provide an improved construction and assembly of the ported cap-plate for the open top of the meter body, the bellows units, flag rods and valve operating mechanism, so that said assembly may be readily mounted in its operative position on the meter body or removed therefrom.

A further object of the invention is to provide a compact arrangement of the lever connections between the flag rods and valve operating crank shaft with a cover therefor secured to the meter body and forming a gas delivery chamber, together with a common sealing gasket interposed between said cover and cap plate and the top surfaces of the meter body.

An additional object of the invention resides in the provision of a box or housing for the indexing or registering mechanism on the meter cover, with one of the attaching screws for said cover inaccessibly located in said housing, so that wire sealing of the glass carrying section of the housing in closed position also results in the effective sealing of the cover against removal from its applied position on the meter body.

With the above and other subordinate objects in view, the invention comprises the improved gas meter and the construction and relative arrangement of its several cooperating parts, as will hereinafter be more fully described, illustrated in the accompanying drawings, and subsequently incorporated in the subjoined claims.

In the drawings, wherein I have illustrated one simple and practical embodiment of the invention, and in which similar reference characters designate corresponding parts throughout the several views.

Figure 1:
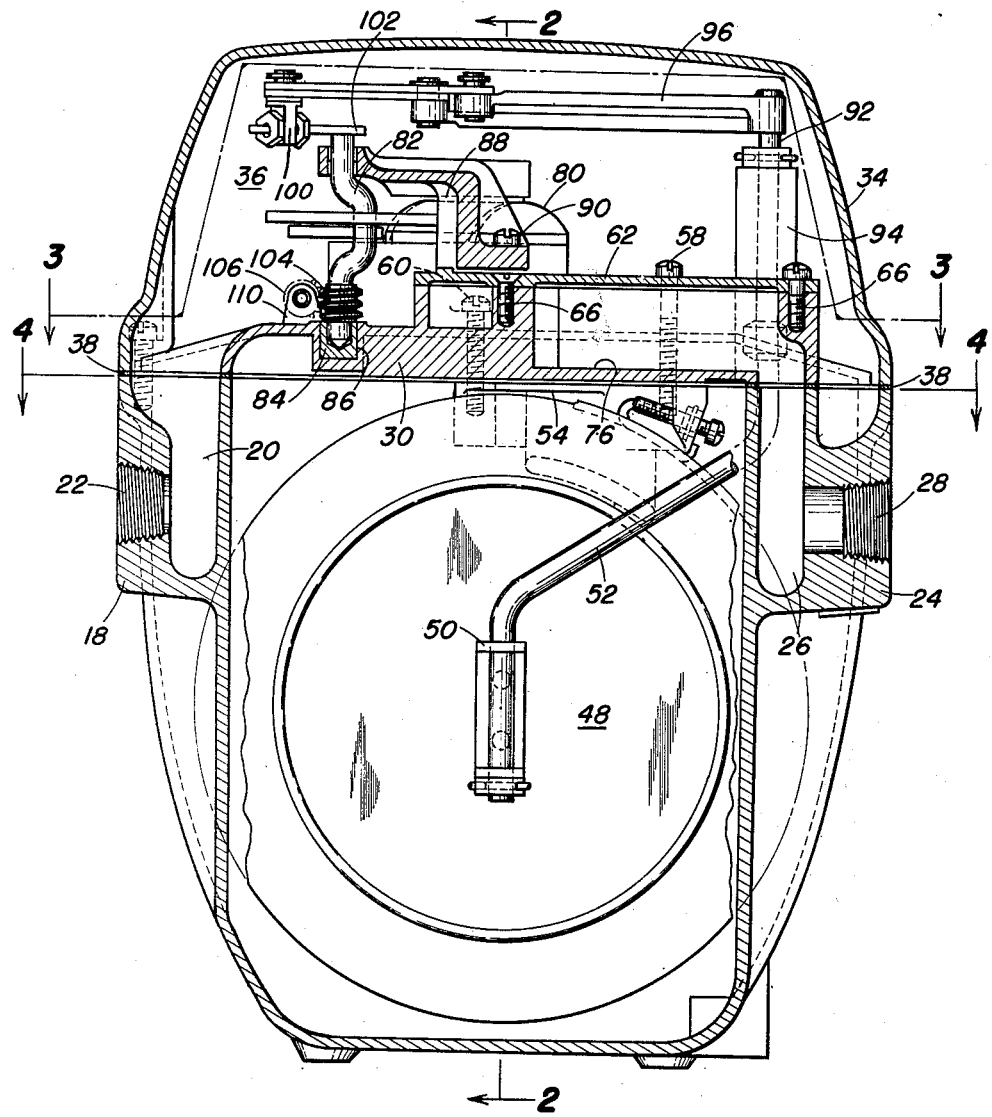
Figure 1 is a vertical longitudinal section of a gas meter embodying the present invention, taken substantially on the line 1—1 of Figure 2.

Referring in further detail to the drawings, the meter body 10 is internally divided by a vertical partition wall 12 to form with the body walls of the meter isolated measuring chambers 14 and 16 respectively. The wall 12 at its upper end terminates on a common plane with the upper surfaces of the walls of the body structure 10. As herein shown, one side wall of the meter body 10 has an external formation 18 at its upper end provided with a gas inlet passage 20 opening through the top thereof, and a threaded opening 22 for a connecting nipple with the gas supply line. At its opposite side, the body wall of the meter is also provided with an external formation 24 having a gas outlet passage 26 opening through the top thereof, and a threaded opening 28 for a connecting nipple with the service pipe line.

The open upper ends of the measuring chambers 14 and 16 in the meter body are adapted to be closed by a cap plate 30. Upon this plate, the gas inlet and outlet control valves and the operating mechanism therefor are mounted, said plate being formed at one end with the recess 32 to register with the upper end of gas inlet passage 20 in the meter body. A cover member 34, mounted on the meter body, encloses the plate 30 and valve mechanism mounted thereon, and forms a gas delivery chamber 36. Between the lower edge of this cover member and plate 30, and all top surfaces of the meter body, a common sealing gasket 38 is interposed and is provided with appropriately located openings therein for the free flow of gas between chamber 36 and the measuring chambers, and to outlet passage 26 through suitable ports and passages formed in the cap plate 30.

In addition to the valve operating mechanism, a pair of diaphragm type bellows 40 and 42 are also carried by the cap plate 30 to operate in the respective chambers 14 and 16 of the meter body as secondary gas measuring chambers. Preferably, these bellows units are of the construction described and claimed in my pending application Serial No. 560,655, filed October 27, 1944, and which has matured into Patent No. 2,514,388. For the purposes of this present explanation, it will therefore suffice to state that each bellows unit includes a fixed pan member 44 having an outwardly flared circumferential wall to which the outer edge of a flexible membrane or diaphragm 46 is securely attached. The central portion of this diaphragm is rigidly held or clamped between metal discs 48 to which a bracket member 50 is riveted, and provides a pivotal connection between the diaphragm and the lower end of a flag rod 52.

Figure 4:
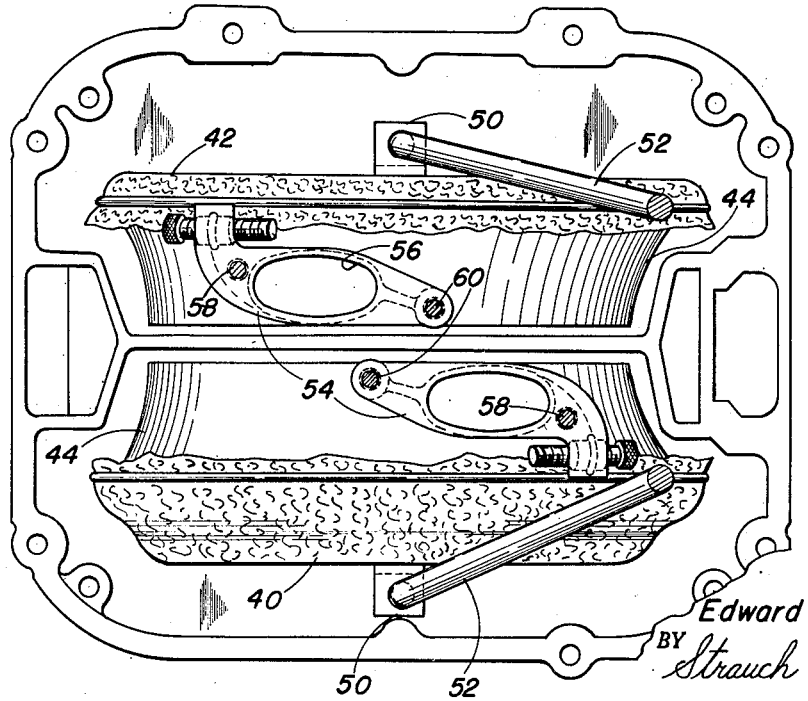
Figure 4 is a horizontal sectional view taken substantially on the line 4—4 of Figure 1.
Figure 5:
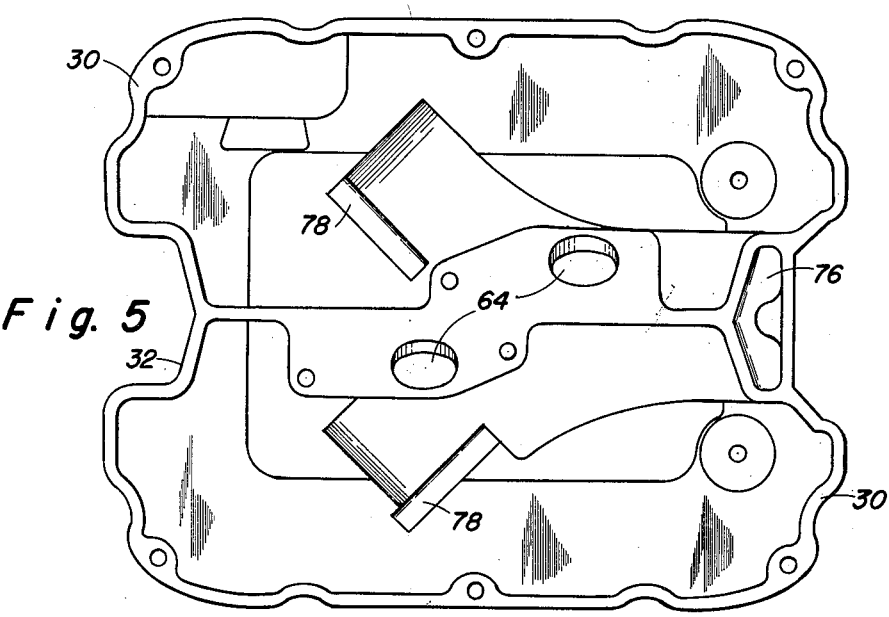
Figure 5 is a bottom plan view of the cap plate for the meter body.
Figure 6:
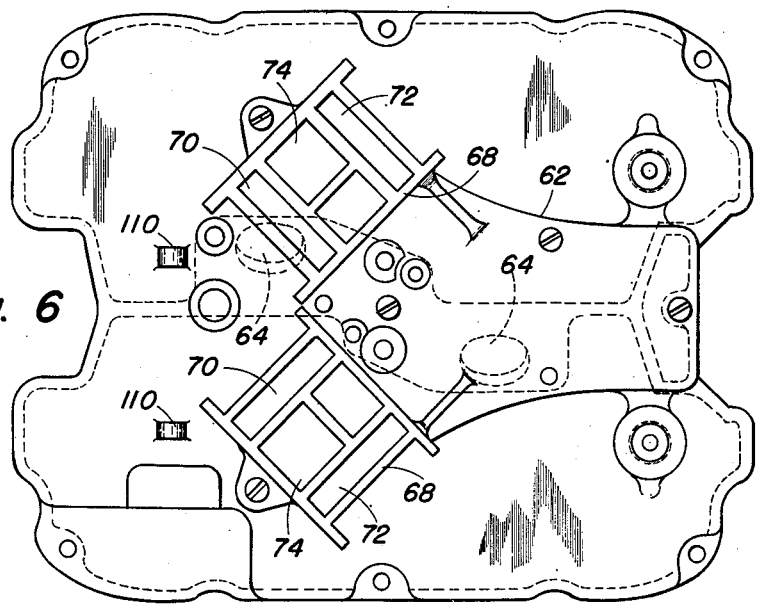
Figure 6 is a top plan view of the valve seat plate casting.

A flanged bracket member 54 is formed with a tubular neck 56 of elongated form in cross section, as seen in Figure 4 of the drawings, said neck at its lower end extending within an opening at the top of the circumferential wall of the pan member 44 and being securely welded or otherwise fixed to said wall. At the upper end of neck 56, the bracket flange at each side of said neck is formed with a boss having a threaded bore to receive the lower ends of the attaching screws 58 and 60 respectively. The screws 58 are relatively long and extend through the plate 30 and the valve seat casting 62, which is preferably cemented upon the plate 30 and closes the upper sides of the gas flow channels or passages therein. The other screws 60 are relatively short and the heads thereof seat upon suitable bosses formed on the plate 30. In this manner, it will be seen that the bellows units may be rigidly connected with the plate 30 while the adjacent material of the gasket 38 is tightly compressed to maintain a gas-tight seal between the tubular neck portions 56 of the brackets, and ports or passes 64 in the cap plate 30 opening upon the lower face thereof, and through which gas is supplied to the respective bellows chambers from chamber 36 and exhausted therefrom to the outlet 26 in the operation of the valve mechanism. The valve seat casting 62 is also further secured to the cap plate 30 by means of the additional attaching screws 66.

The valve seat casting 62 comprises an elongated plate having angularly related raised valve seats 68 formed on one end thereof, each provided with spaced gas inlet ports 70 and 72, respectively, and an intermediate outlet port 74. Each of the latter ports registers with one end branch of the outlet passage 76 formed in cap plate 30, the other end of which registers with the upper end of the outlet passage 26 in the meter body, as shown in Figure 1 of the drawings. The upper ends of passages 64 are in communication with the respective ports 70 of the valve seats, while the ports 72 thereof register with the upper ends of ports 78 in the cap plate 30, which open at their lower ends in communication with the respective main measuring chambers 14 and 16. The valve means and its operating mechanism controlling the flow of gas through the two series of ports 70, 72 and 74, whereby gas is alternately admitted from chamber 36 to each measuring chamber 14—16, and the bellows chamber associated therewith, and exhausted from said chambers through the outlet passage 26 is substantially the same as that disclosed in a second copending application Serial No. 559,091, filed August 24, 1944 and which has matured into Patent No. 2,525,487. Thus the valve members 80 are mounted for rectilinear reciprocating motion on the valve seats 68 in the manner shown in said application, and are operatively connected with a vertical crank shaft 82 journalled at its lower end in a replaceable bearing 84 mounted in a cylindrical recess 86 formed in the cap plate 30. The upper end of said shaft is journalled in a suitable bearing in one end of the bracket arm 88, the other end of which is secured to the valve plate casting 62 by the screws 90.

Each flag rod 62 has a portion 92 laterally offset from the bracket 50 and extending upwardly through suitable openings in the cap plate 30 and the long packing gland 94 integrally formed on one end of the valve plate casting 62, which contains felt or other suitable packing material, effectively preventing leakage of gas from chamber 36 around the flag rods and into the meter chambers 14 and 16. Above the glands 94, a horizontally disposed lever 96 is rigidly fixed at one of its ends in any suitable manner to the upper end of each flag rod. These levers extend inwardly over the valve seat casting 62 in crossed or intersecting relation to each other, and at their other ends are pivotally connected by means of links 98 to a pivot post 100, adjustably mounted on the tangent arm 102 fixed to the upper end of the crank shaft 82. Thus it will be seen that substantially all of the linkage connections between the crank shaft and the flag rods overlie the valve plate casting 62, so that a cover member 34 of minimum dimensions may be employed.

The crank shaft 82 at its lower end is provided with a worm 104, in constant mesh with worm gear 106 fixed to shaft 108 journalled in suitable spaced bearings 110 formed on the cap plate 30. The shaft 108 at one of its ends is provided with a suitable coupling head 112 for a purpose to be presently explained.

After the two bellows units have been assembled upon the cap plate 30 together with the valve operating mechanism and packing gasket 38 in the manner above explained, this unitary assembly is then mounted upon the upper end of the meter body. The marginal edge portion of cap plate 30 seats upon suitable internal formations on the walls of the meter body having threaded bores to receive the spaced attaching screws 114, whereby the two bellows units are accurately positioned in the respective meter chambers 14 and 16, at opposite sides of the partition or dividing wall 12 between said chambers, and packing gasket 38 is tightly compressed between the opposed upper surfaces of the meter body walls and the lower face of cap plate 30.

The cover member 34 on one side thereof is provided with a box or housing 116 for indexing or registering mechanism generally indicated at 118, said housing including a cover section 120 which is adapted to be secured in its closed position by a conventional wire seal. The drive shaft 122 for the registering mechanism 118 is journalled in a suitable bearing 124 on the inner wall of housing 116, and at its inner end has a coupling head 126 adapted for driving connection with the coupling head 112 on shaft 108 when the cover member 34 is mounted on the meter body over the valve mechanism.

Figure 2:
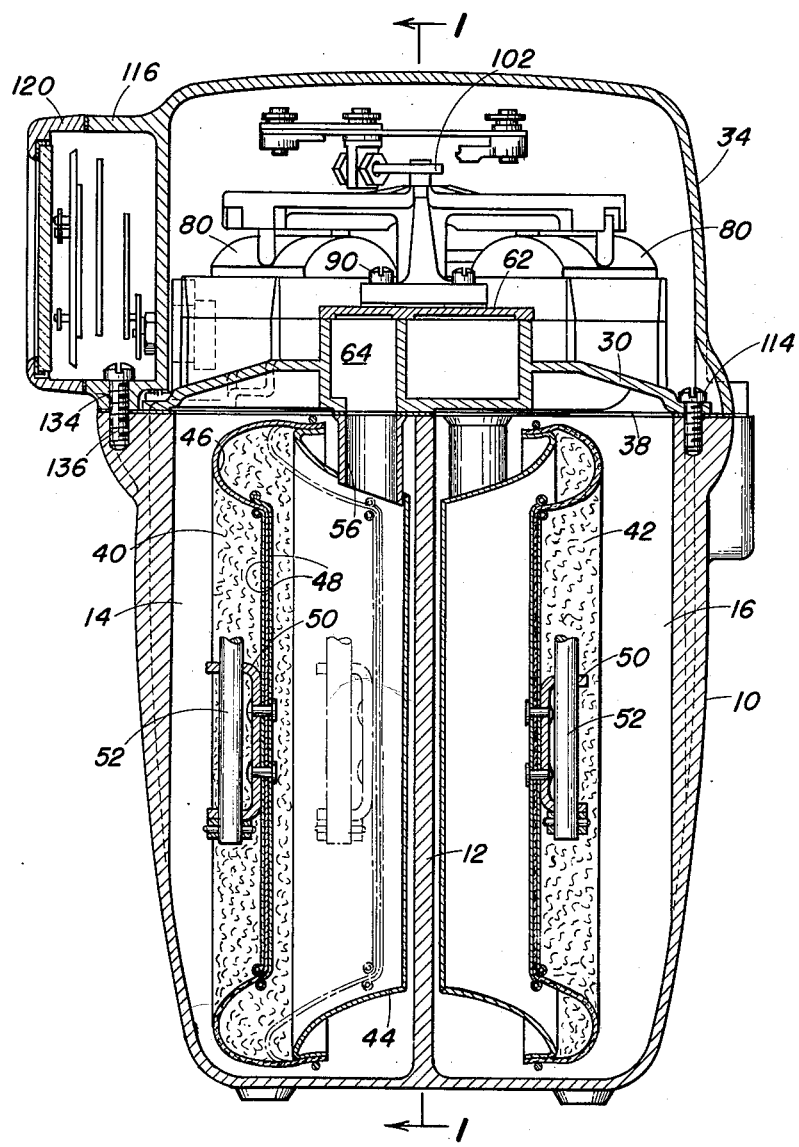
Figure 2 is a transverse vertical sectional view taken substantially on the line 2—2 of Figure 1.
Figure 3:
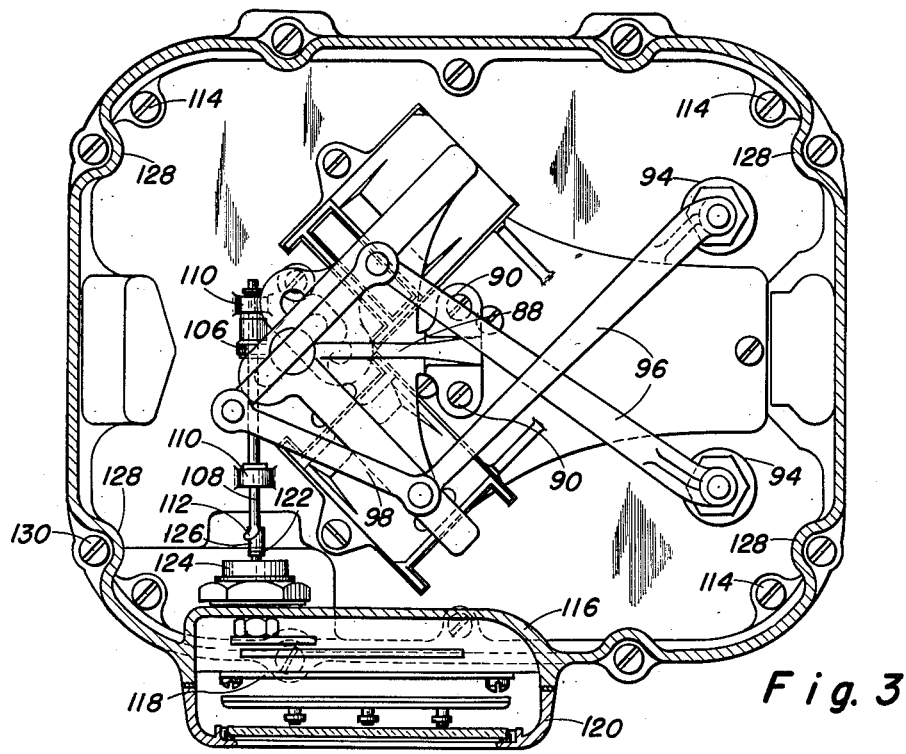
Figure 3 is a horizontal sectional view taken substantially on the line 3—3 of Figure 1.

The side walls of the cover 34 are indented at spaced points as at 128 to provide apertured ears or lugs at the lower edge of said walls, receiving the attaching screws 130 threaded into external formations on the body walls of the meter to rigidly connect the cover member thereto with a uniformly tight clamping pressure of said member upon the marginal edge portion of the packing gasket 38, whereby leakage of gas from the chamber 36 is prevented. It will also be noted, from reference to Figure 2 of the drawings, that the integrally formed wall of housing 116 on the cover 34 at the bottom thereof, is provided with an opening 134 to receive an attaching screw 136. Thus this screw will be inaccessible, after the housing cover 120 has been sealed in its closed position so that this single wire seal (not shown)

will also serve as a seal for cover member 34, preventing its removal from the body of the meter, and unauthorized tampering with the register driving mechanism.

Preferably, the major parts of the above described meter, including the body 10, cover 34, and members 30, 62 and 88, are pressure cast from an aluminum alloy, selected for its resistance to warpage or distortion, and providing a high safety factor against internal pressure stresses. The valve members 80 are preferably formed from a phenolic condensation product, such as "Bakelite." Also the valve arms connected with crank shaft 82 are preferably integrally formed with the valve members 80, as this material has been found to be superior in its wear resisting qualities to link connections of brass or other metals. It has further been found that the physical properties of the pressure cast aluminum alloy parts are substantially immune to extreme temperature fluctuations, so that the meter will function with equal efficiency when used in tropical or temperate climates, and at sea level or high altitudes.

It will of course be understood that if desired, instead of connecting the supply and service pipes horizontally with inlet and outlet passages in the meter body, the present invention is equally adaptable for use in connection with that type of meter in which the pipe lines are vertically connected to inlet and outlet passages formed on the cover member 34, an example of which may be seen in Armstrong Patent No. 1,062,268, issued May 20, 1913.

From the above description and the accompanying drawings, it will be appreciated that the present invention provides a dual bellows type gas meter of large capacity, minimum over-all dimensions, and very low weight. It will also be evident that the several cooperating elements are of simple and durable structural form, thus insuring long life and consistently uniform operating efficiency. By reason of the mounting and arrangement of the connected parts of the several primary units, the complete assembly may be accurately and expeditiously effected. It may further be noted that in comparison with prior gas meters of this type, the present invention provides a greatly simplified construction, thus conducing to low production cost and minimum maintenance expense.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a gas meter, an open top body having main gas chambers and gas inlet and outlet passages, a ported cap plate secured upon the open top of said body and carrying bellows structures disposed within the respective main gas chambers, a valve seat casting comprising a plate secured upon said cap plate and provided at one end with valve seats, a slide valve on each of said seats, and actuating means for said valves mounted on the cap plate and operatively connected with said bellow structures including a crank shaft vertically disposed between adjacent ends of said seats, a renewable step bearing for the lower end of said shaft mounted in said cap plate, and bearing means for the upper end of said crank shaft secured to the valve seat casting between the valve seats thereof.

2. In a gas meter as defined in claim 1, a register drive shaft mounted on said cap plate and geared to said crank shaft adjacent to said step bearing.

EDWARD R. GILMORE.

REFERENCES CITED

The following references are of record in the file of this patent:

UNITED STATES PATENTS

| Number | Name | Date |
|---|---|---|
| 987,379 | Knight | Mar. 21, 1911 |
| 1,062,268 | Armstrong | May 20, 1913 |
| 1,283,025 | Armstrong | Oct. 29, 1918 |
| 1,668,078 | Huettig | May 1, 1928 |

FOREIGN PATENTS

| Number | Country | Date |
|---|---|---|
| 108,051 | Sweden | July 27, 1943 |
| 382,203 | Great Britain | Oct. 20, 1932 |
| 548,802 | Great Britain | Oct. 26, 1942 |